(12) United States Patent
Kwoh

(10) Patent No.: US 6,526,576 B1
(45) Date of Patent: Feb. 25, 2003

(54) PROGRAM GUIDE FOR DBS AND CABLE TV

(75) Inventor: Daniel S. Kwoh, La Canada/Flintridge, CA (US)

(73) Assignee: Index Systems, Inc. (VG)

( * ) Notice: Subject to any disclaimer, the term of this patent is extended or adjusted under 35 U.S.C. 154(b) by 0 days.

(21) Appl. No.: 09/194,963

(22) PCT Filed: Jun. 6, 1997

(86) PCT No.: PCT/US97/09912

§ 371 (c)(1),
(2), (4) Date: Jul. 15, 1999

(87) PCT Pub. No.: WO97/47136

PCT Pub. Date: Dec. 11, 1997

Related U.S. Application Data

(60) Provisional application No. 60/019,012, filed on Jun. 6, 1996.

(51) Int. Cl.[7] .......................... H04N 5/445; G06F 3/00; G06F 13/00
(52) U.S. Cl. .............................. 725/39; 725/48; 725/59; 725/68; 725/70
(58) Field of Search .............................. 725/39–55, 48, 725/59, 68, 70

(56) References Cited

U.S. PATENT DOCUMENTS

| | | | | |
|---|---|---|---|---|
| 5,305,382 A | | 4/1994 | Hayashi ........................ 380/23 |
| 5,532,754 A | | 7/1996 | Young et al. ................ 348/569 |
| 5,532,760 A | * | 7/1996 | Inoue .......................... 348/729 |
| 5,550,576 A | * | 8/1996 | Klosterman .................. 725/46 |
| 5,625,406 A | | 4/1997 | Newberry et al. ............. 348/7 |
| 5,828,945 A | * | 10/1998 | Klosterman .................. 455/42 |
| 5,923,362 A | * | 7/1999 | Klosterman .................. 725/48 |
| 6,025,869 A | * | 2/2000 | Stas et al. ..................... 725/28 |
| 6,072,983 A | * | 6/2000 | Klosterman .................. 725/49 |

* cited by examiner

Primary Examiner—Andrew Faile
Assistant Examiner—Ngoc Vu
(74) Attorney, Agent, or Firm—Christie, Parker & Hale, LLP

(57) ABSTRACT

In A direct broadcast satellite (DBS) systems, local over the air channels are not included in the satellite signal or in the program guide provided by conventional direct broadcast satellite systems. Rather, over the air channels may be received from a television antenna or a cable television system. The disclosed system for providing an electronic program guide for both over the air channels and direct broadcast satellite channels includes a VCR (80) with an RP tuner. The RE signal carrying the over the air channels is connected to the RF input (64) of the DBS receiver (50), combined with all RF modulation on channel 3 (or 4) of the DBS channel tuned by the DBS receiver. The combined RF signal is sent to the RF tuner in the VCR, which tunes either channel 3 (or 4) for the DBS channel or the appropriate RF channel for a local over the air channel. The output of the RF tuner is output on the VCR's baseband video output (84) which is connected to a baseband video input (66) on the DBS receiver. This system provides a baseband video signal for both over the air and DBS channels which can be used by an electronic program guide controller in the DBS receiver to produce a program guide which has the video picture as an integral part of the guide to use the picture of both over the air and DBS channels. This system also allows an electronic program guide controller in the DBS receiver to receive program data from either the satellite signal or the over the air signal.

6 Claims, 3 Drawing Sheets

PROGRAM GUIDE FOR DBS AND CABLE TV

This application claims benefit of Ser. No. 60/019,012 filed Jun. 6, 1996.

FIELD OF INVENTION

The present invention relates to direct broadcast satellite systems. In particular the present invention relates to a method and apparatus for providing an electronic, interactive program guide that includes guide information for both DBS and over-the-air channels in a format that is seamless between the DBS and OTA channels.

BACKGROUND OF THE INVENTION

The first direct broadcast satellite ("DBS") system, DSS—Digital Satellite System (DSS is a trademark of DIRECT, Inc. a unit of Hughes Electronics Corp.), was launched in late 1994 and now carries up to 200 channels. Since that time, several other DBS system have been launched in the United States, including PrimeStar, EchoStar (DISH Network) and AlphaStar (PrimeStar is a trademark of Primestar Partners, Limited, EchoStar and DISH Network are trademarks of Echostar Communications Corporation, AlphaStar is a trademark of AlphaStar Television Network Inc.). By federal regulations, no local over-the-air ("OTA") channels are carried by DSS or any other DBS system. DBS users have to have a separate rooftop antenna or subscribe to basic cable television service to receive such channels. After the launch of DBS systems, feedback from the market place was received that consumers look upon the availability of local channels as a very important issue. DBS receivers generally have an antenna input port for connecting to the rooftop antenna or cable television system. There is however, no built in RF tuner to receive the signal in most DBS receivers. The signal from the antenna input port is simply passed through to the TV, with the TV's tuner tuning the OTA channels.

With 150 or more channels of programming, most DBS systems send a program guide through a data channel that is part of the satellite broadcast, at very high speed. The data contains information for approximately the next 3 days for the DBS channels. Using the high data rate, the mode of operation is like teletext: data is continuously sent in a loop; there is a waiting time of a few seconds (almost no wait for the next few hours listings; longer wait for programs more into the future; also longer wait in first generation machines). The program guide contains data only for the DBS channels, and no data for local OTA channels. Even though at any given locality, there are only 10–20 local OTA channels compared with 150 or more DBS channels, for the whole U.S., there are close to 1700 OTA channels. To send program information for all these 1700 stations over the data channel currently used for guide information on DBS systems will involve more than 10 times the data required for DBS channels, which, in a loop, would require tens of seconds, which consumers would find unacceptable.

Electronic program guides ("EPGs") are also available for OTA and cable television systems. An example of such an EPG is described in PCT published application, publication number WO 96/07270, published Mar. 7, 1996 which is hereby incorporated by reference as if fully set forth herein and in U.S pending patent application Ser. No. 08/475,395, filed Jun. 7, 1995 and Ser. No. 08/744,399 which is also hereby incorporated by reference as if fully set forth herein. The applications disclose EPG systems with an EPG module generally located in either a VCR or a television. In either case, the program data used by the EPG is transmitted over OTA or cable channels encoded in vertical blanking interval ("VBI") of these television signals. In one embodiment, all of the program data for a time period, such as several days or a week, is loaded via VBI into the EPG module in the middle of the night and stored in memory. Then, when the EPG is used during the day or the evening, all of the program data needed by the consumer is resident locally in the EPG. An embodiment of the inventions disclosed in the applications is marketed in the United States under the trademark GUIDE PLUS+, owned by Gemstar Development Corporation.

BRIEF DESCRIPTION OF THE DRAWINGS

These and other features, aspects, and advantages of the present invention will become better understood with regard to the following description appended claims, and accompanying drawings where:

DETAILED DESCRIPTION

One method to achieve a seamless guide which includes program data for both OTA and DBS channels is to have an electronic program guide ("EPG") module that receives program data for the DBS channels from the satellite signal and program data for the OTA channels from the OTA RF signal. In this arrangement, because the program data for the OTA channels included on the OTA RF signals only needs to include the 10–20 channels that are receivable in that local area, rather than the 1700 OTA channels available across the United States, the amount of program data that needs to be transmitted to a particular DBS receiver is substantially less than if the program data was broadcast over the DBS signal. In order to utilize this arrangement, though, the EPG module must have access to the output of both a DBS digital signal decoder for the program data for the DBS channels and an RF tuner for the program data for the OTA channels.

Further, any EPG module which includes OTA and DBS channels and has the video picture as an integral part of the guide (as in a guide utilizing a "picture-in-picture" ("PIP") window within the guide showing a reduced size reproduction of a full screen picture, a guide which has the guide overlaying the bottom or other part of the picture, or even a guide which covers most of the television picture) must make use of both an RF tuner and a DBS digital signal decoder from somewhere in the system in order to create a picture for both OTA and DBS channels.

Figure 1:
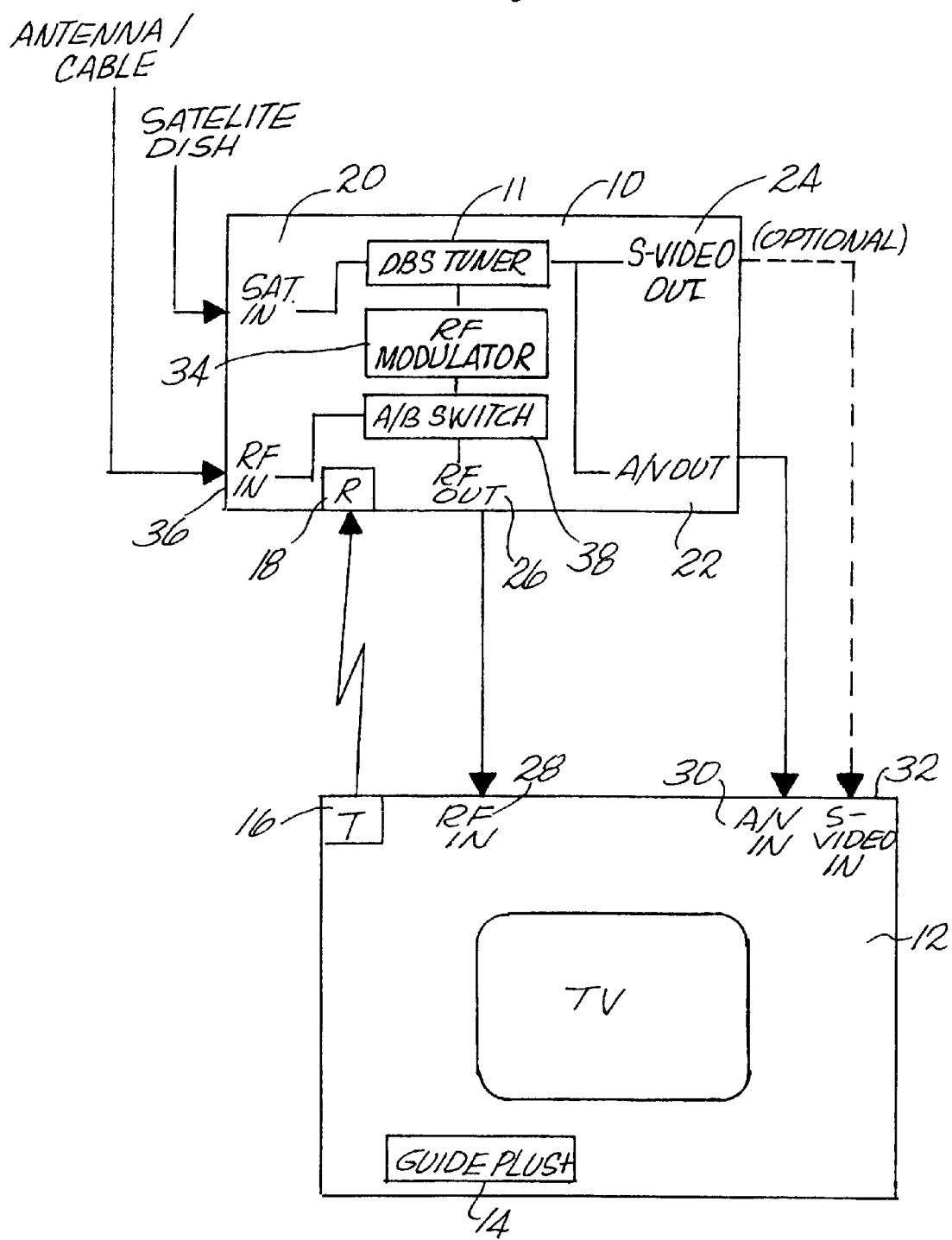
FIG. 1 is a schematic block diagram of a direct broadcast satellite system in which the electronic interactive program guide control center is located in a television.

However, DBS receivers, which by definition have a DBS digital signal decoder, generally do not have RF tuners and thus the DBS receiver EPG module does not have access to an RF tuner. On the other hand, DBS receivers are always connected to televisions, which have RF tuners (some even have 2 tuners). The problem is that televisions rarely have RF or video outputs that can be connected to and thus utilized by the DBS receiver. Accordingly, one option, as shown in the embodiment shown in FIG. 1 is to include an EPG module 14 in an EPG television 12, where an RF tuner (not shown) is located. In this location, the EPG module 14 also has access to the output the DBS digital signal decoder 11 in the DBS receiver 10. EPG television 12 includes a remote control transmitter 16 for controlling the DBS receiver 10 through the DBS receiver's remote control receiver 18 (throughout this specification, remote control is used generically to include any remote control techniques feasible for consumer electronics applications, including, but not limited to infra-red and radio frequency remote control techniques). Using the television's remote control transmitter 16, the EPG module 14 can also control the DBS digital signal decoder 11.

For satellite channels, the signal is received from satellite dish into the satellite input (SAT. IN) 20 of the DBS receiver. The DBS receiver performs a tuner function for the signals on the satellite input and outputs a television signal of the selected DBS channel on a number of outputs. These outputs include audio and NTSC baseband video outputs (A/V OUT) 22, an S-video output (S-VIDEO OUT) 24 and an RF output (RF OUT) 26, on which the audio and NTSC baseband video signals are modulated onto either RF channel 3 or 4.

Almost all televisions have antenna or RF inputs (RF IN) 28. In the embodiment of FIG. 1, if the connection between the RF OUT 26 of the DBS receiver and the RF IN 28 of the television is used, the DBS channel tuned by the DBS receiver is modulated onto channel 3 or 4 by RF modulator 34. The RF tuner (not shown) in the television is then tuned to the channel on which the DBS channel is modulated (channel 3 or 4) and the television thus receives and is able to display that DBS channel on the television's screen. More modern televisions also include separate audio and baseband NTSC video inputs (A/V IN) 30. When the television's A/V IN 30 jacks are connected to the A/V OUT 22 of the DBS receiver, the DBS channel tuned by the DBS receiver is simply output, at baseband on the A/V OUT 22 on the DBS receiver, and the television receives this signal and is able to display that DBS channel on the television's screen. Using the A/V OUT rather than the RF OUT of the DBS receiver generally results in better picture quality because the audio and baseband video signals from the DBS digital signal decoder do not have to be modulated and then demodulated onto and off from channels 3 or 4. The biggest potential problem with using the A/V OUT is that the baseband video cannot be transmitted over great distances. However, as most DBS receivers are installed within a couple of feet of the television, this potential problem is not usually an issue.

Even more modern, higher end televisions include an S-Video input (S-VIDEO IN) 32. The S-Video input uses multiple conductors to allow the transmission of a better video signal than can be achieved using NTSC baseband video, the details of which are not relevant to the present invention. Thus, in systems with televisions with S-Video inputs, the S-VIDEO IN of the television is connected to the S-VIDEO OUT of the DBS receiver instead of connecting the A/V IN of the television to the A/V OUT of the DBS receiver. Again, this connection is used to transmit received DBS channels from the DBS receiver to the television.

For OTA channels, the lead from a rooftop antenna or the cable from a cable television system is connected to the RF antenna/cable input (RF IN) 36 of the DBS receiver. Most DBS receivers contain a simple A/B switch 38 that allow a user to switch the RF output 26 between the tuned DBS station and the OTA RF source. Thus if a user is using the RF IN of the television for both OTA channels and DBS channels and is watching a DBS channel, when the user wants to change to an OTA channel, the user changes the A/B switch 28 (e.g., with a remote control button labeled such as "TV/DSS" in some DSS systems) and then changes the television's RF tuner to the channel of the desired OTA channel. Later, when a DBS channel is desired, the television's RF tuner is tuned back to channel 3 or 4 and changes the A/B switch back again. In system arrangements which utilize a cable box for tuning OTA channels, the process above is only changed by the user using the cable box to tune the OTA channels rather than the television's RF tuner. In systems in which the cable box has a remote control receiver, this change may be transparent to the user if the television is set up to receive channel commands directed toward the television's RF tuner and converting those commands into channel change commands for the cable box which are transmitted to the cable box by remote control transmitter 16.

In the alternative connection arrangements utilizing the A/V OUT or S-VIDEO OUT of the DBS receiver, the process of changing between a DBS channel and an OTA channel is the same except rather than changing the A/B switch between OTA and DBS sources, the user changes the source the television displays between A/V IN and RF IN or between S-VIDEO IN and RF IN.

A problem with the embodiment shown in FIG. 1 is that it requires the consumer to buy a new television. A solution to this problem is to keep the EPG module in the DBS receiver but add OTA functionality to it. As discussed above, to add OTA functionality to the DBS receiver or to combine a guide with an OTA picture using a DBS receiver, the DBS receiver must have access to an RF tuner. Also as discussed above, televisions, which are always connected to DBS receivers, have RF tuners. Unfortunately, most televisions do not have baseband video outputs or RF outputs. Most VCR's, by contrast, have both baseband video outputs and RF outputs. Further, most VCR's are already put in the signal path between the DBS receiver and the TV. Embodiments of a system which keep the EPG module in the DBS receiver but adds OTA channels to the guide by giving the DBS receiver access to the RF tuner in a VCR are shown in FIGS. 2 and 3.

Figure 2:
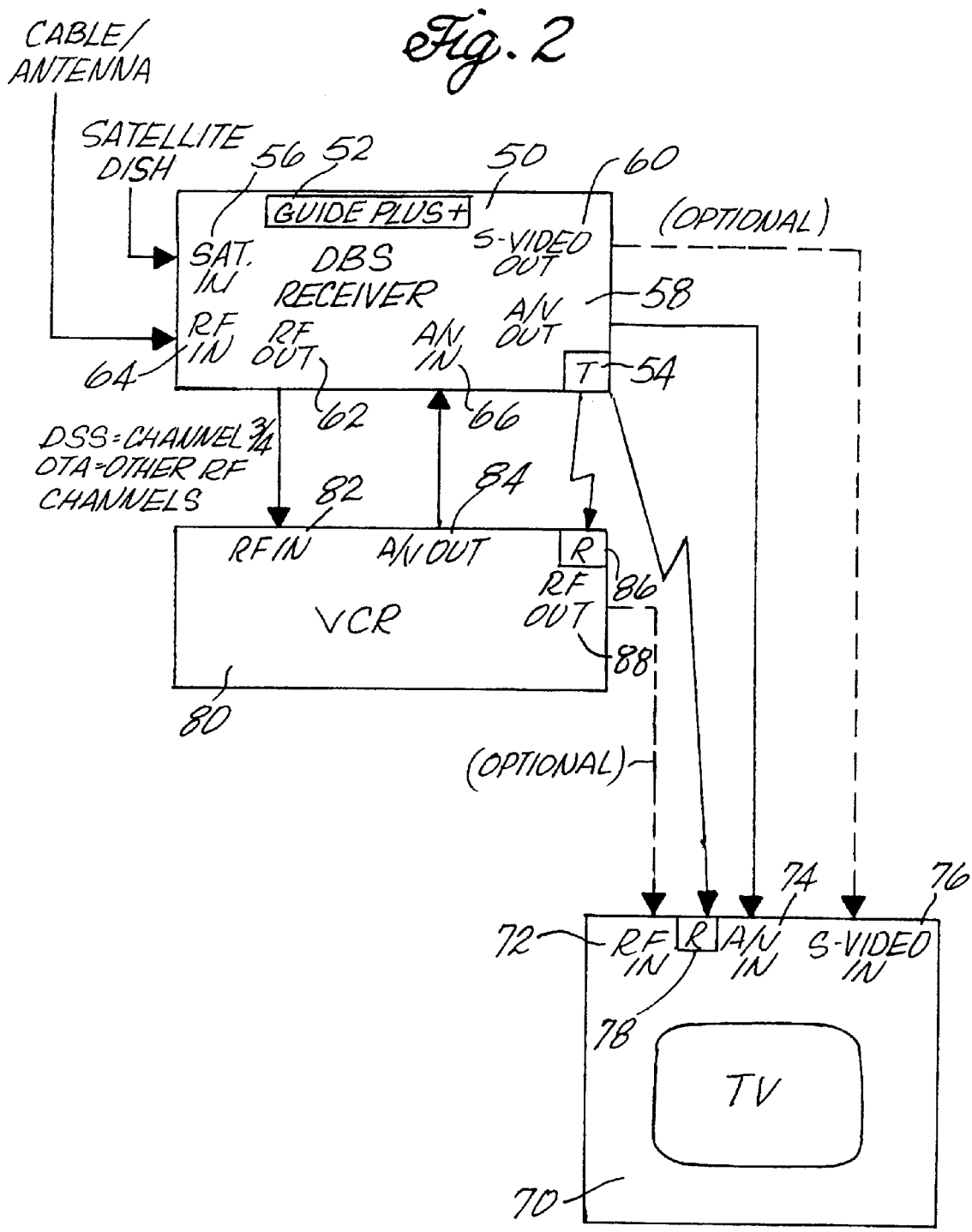
FIG. 2 is a schematic block diagram of a direct broadcast satellite system in which the electronic interactive program guide control center is located in the satellite receiver and a VCR is used as a tuner for over the air channels.
Figure 3:
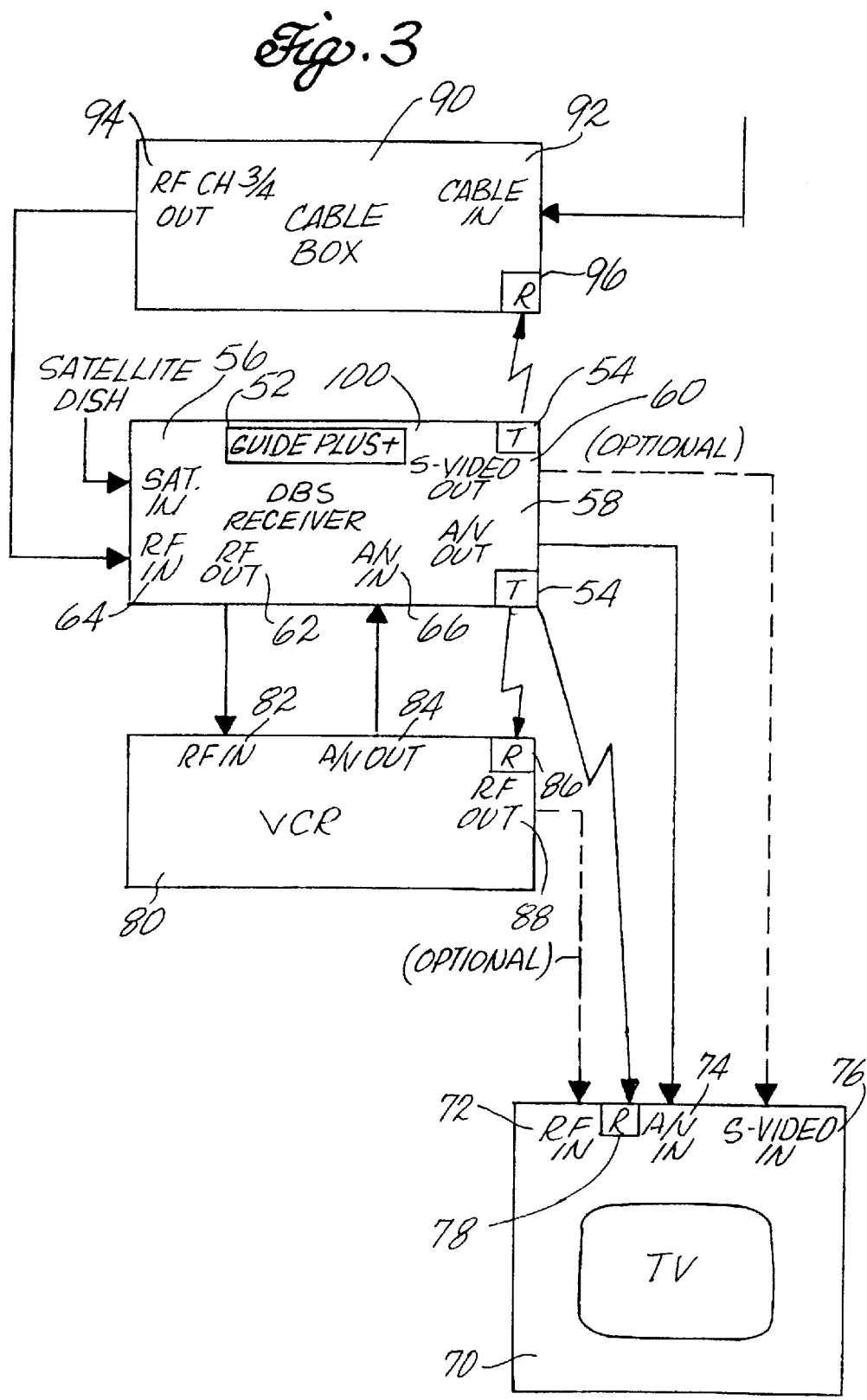
FIG. 3 is a schematic block diagram of a direct broadcast satellite system combined with a cable television system which utilizes a cable box in which the electronic interactive program guide control center is located in the satellite receiver and the cable box is used as a tuner for over the air and cable channels and a VCR is used as a channel ¾ demodulator.

To start, FIGS. 2 and 3 include a improved DBS receivers 50 and 100. The improved DBS receivers 50 and 100 are similar to conventional DBS receiver 10, except that it has additional hardware and functions not found in conventional DBS receiver 10. On the other hand, elements of the conventional DBS receiver 10 such as DBS digital signal decoder 11 and RF modulator 34 are also included in improved DBS receiver 50, but not shown in FIGS. 2 and 3. As will be explained in more detail below, another change between conventional DBS receiver 10 and improved DBS receiver 50 shown in FIG. 2 is that A/B switch 38 in conventional DBS receiver 10 is replaced in improved DBS receiver 50 with a 2 way combiner (not shown). Improved DBS receiver 100 in FIG. 3, however, contains the same A/B switch 38 as conventional DBS receiver 10. Notwithstanding the replacement of the A/B switch by a 2 way combiner in improved DBS receiver 100, SAT. IN 56, A/V OUT 58, S-VIDEO OUT 60, RF OUT 62 and RF IN 64 of improved DBS receivers 50 and 100 shown in FIGS. 2 and 3 perform the same basic functions and carry the same basic signals as SAT. IN 20, A/V OUT 22, S-VIDEO OUT 24, RF OUT 26 and RF IN 36, respectively, in conventional DBS receiver 10.

Improved DBS receivers 50 and 100 also includes an EPG module 52, a remote control transmitter 54 and audio and baseband NTSC video inputs (A/V IN) 66 that are not in conventional DBS receiver 10. The functions of these elements are discussed below. (It is noted that remote control transmitter 54 is shown as two separate boxes in FIG. 3, however, this is not meant to be an indication that implementation of remote control transmitter 54 in either FIGS. 2 or 3 necessarily consists of a single or multiple remote control transmitters, respectively, but, rather, is shown as two boxes in FIG. 3 for convenience in showing the transmission paths of the remote control signals transmitted by the remote control transmitter 54.)

Conventional television 70 is identical to EPG television 12, except that conventional television 70 does not have an EPG module 14 or a remote control transmitter 16. RF IN 72, A/V IN 74 and S-VIDEO IN 76 of conventional television 70 shown in FIGS. 2 and 3 perform the same basic functions and carry the same basic signals as RF IN 28, A/V IN 30 and S-VIDEO IN 32, respectively, in EPG television 12. On the other hand, the remote control receiver 78 of conventional television 70 is not shown in EPG television 12 because it is not imperative to the operation of the EPG functions of EPG television 12 even though any commercial embodiment of EPG television 12 would certainly have such a remote control receiver for consumer convenience.

The improved DBS receiver 50 is connected to VCR 80 in order to utilize the RF tuner (not shown) in the VCR. RF OUT 62 of the improved DBS receiver is connected to the RF IN 82 of the VCR. The RF tuner in the VCR tunes an RF channel, generally an OTA channel and outputs the audio and baseband NTSC video signal on A/V OUT 84. A/V OUT 84 is connected to A/V IN 66 of improved DBS receiver 50.

Returning the operation of the improved DBS receiver 50, the improved DBS receiver is the main control center, controlling the VCR 80 with remote control transmitter 54. The different operation scenarios are as follows:

1. Watching TV

If the user is watching a DBS channel, the DBS input signal is directed through the DBS digital signal decoder to become a baseband video and audio signal which are then output to the A/V input of the TV. This offers the better picture quality of DBS channels to the TV than modulating the audio and baseband video signal on channel 3 or 4. Alternatively, the DBS digital signal decoder generates an S-Video baseband video signal which it output to the S-Video IN 76 of the television, which offers the best picture quality of DBS channels to the television.

If the user wants to watch an OTA channel, the improved DBS receiver switches its input select to the RF input 64, directly passes that to the RF output 62 to be sent to the VCR RF input 82. The improved DBS receiver should control the VCR to be in the POWER ON state (e.g., the improved DBS receiver can sense whether the VCR is already in the ON state by sensing whether there is a video signal at its A/V input 66, coming from the A/V outputs 84 of the VCR. If the VCR is already ON, improved DBS receiver 50 will do nothing: if VCR is OFF, the improved DBS receiver 50 can send a remote control signal to turn the VCR on). The improved DBS receiver 50 can then send a channel changing signal (e.g. by the remote control transmitter 54) to the VCR to tune. The tuned signal is output from the A/V output 84 of the VCR to the A/V input 66 of the improved DBS receiver 50 which in turn passes it through its A/V output 58 (or alternatively, S-VIDEO OUT 60)to the TV.

2. Recording a Show

In order that the VCR can record both OTA and DBS programs, the DBS baseband video signal needs to be modulated into channel 3 (or 4) frequency and combined with the OTA input signal (which should be empty in either channel 3 or 4) into one single RF signal to be input to the VCR. This is accomplished by a standard 2 way combiner in the improved DBS receiver (not shown) used in place of the A/B switch 38 in conventional DBS receiver 10.

If the show to be recorded is from OTA channel, the VCR is simply tuned to that channel to record.

If the show to be recorded is from a DBS channel, the VCR is tuned to channel 3 while the improved DBS receiver 50 tunes to the correct DBS channel.

If the improved DBS receiver 50 has a second A/V output (not shown), then the DBS baseband video signal can be sent via this second A/V output to the A/V input (not shown) of the VCR to be recorded. This solution will save an RF modulation, probably improving picture quality, but will require a second A/V output jack and only works for DBS channels, not OTA channels, which still must be tuned by the VCR's RF tuner.

3. Playing Back a Tape

Sometimes, the user simply wants to play back a tape from the VCR. In this case, if the improved DBS receiver 50 is off, it should allow the A/V signal from its A/V input 66 to pass directly to its A/V output 58.

4. Record One Channel While Watching Another Channel

To record a show (from DBS or OTA) on the VCR while watching another one on TV, the optional RF path between the VCR and the TV (RF OUT 88 to RF IN 72) needs to be connected. In this case, the VCR is used a tuner to record its show, while the TV/VCR switch is in TV mode. The entire RF signal is then passed out to the RF input of the TV which can then use its own tuner for watching show. In this case, the TV operates in a manner similar to the VCR recording a program (see section 2 above). If the channel to be watched is an OTA channel, the TV is tuned to the OTA channel. If the channel to be watched is a DBS channel, then the TV is tuned to channel 3 (or 4). It is noted, though, that with one DBS receiver it is not possible to use this arrangement to watch one DBS channel while watching another. At least one of the channels to be recorded or watched must be either an OTA or cable channel.

5. Using the Guide i. Program data pre-load

The VBI data slicer for extracting program data from the VBI of the appropriate OTA channel is in the Improved DBS receiver 50 along with the EPG module. In the middle of the night, the Improved DBS receiver 50 should send a remote control signal to turn on the VCR, switch it to tune to the correct host channel that carries the program data on its VBI. The improved DBS receiver 50 takes the video output of A/V OUT 84 from the VCR, slices the VBI pre-load data and stores it in memory.

ii. Usage

In Guide mode, since the picture is an integral part of the Guide (either as PIP, or in non PIP mode, the Guide is overlaid in the bottom half of the picture or over the whole picture in a semi-transparent mode), whenever the user is cursoring up and down the guide, the channel needs to be switched. Channel switching in DBS and OTA channels will be affected as described in section I above ("Watching TV").

FIG. 3 shows an embodiment that addresses the situation where a cable input with a cable box is used instead of an antenna input. If a cable input is used without a cable box, the cable should be connected to the RF IN 64 of the Improved DBS receiver 50 as shown in FIG. 2. The operation is just the same as described above for FIG. 2, with the only provision being that the VCR must be cable ready and its tuner should be set to tune cable frequencies instead of over-the-air broadcast frequencies.

With respect to FIG. 3, a typical cable box 90 outputs a channel 3 or 4 RF OUT 94 signal instead of audio and baseband video output. The channel 3 or 4 RF OUT 94 should be connected to the RF IN 64 of the improved DBS receiver 100. The VCR will be set at channel 3 or 4 to receive the either the cable box output or the modulated, tuned DBS channel, depending on the position of the A/B switch. The channel switching remote control signal is now sent to the cable box instead of the VCR using remote control transmitter 54. The cable box should be left on continuously. In the middle of the night, the improved DBS receiver 50 sends a remote control signal to turn on the VCR (if it is not already on) and switch it to tune to channel 3 or 4. The improved DBS receiver 50 then sends a remote control signal to the cable box to tune to the correct host channel. The pre-load operation then proceeds as before.

Regardless of the embodiment used, there are two alternatives to the delivery and reception of program guide data, the hybrid way and completely by OTA pre-load. For the hybrid way, since the DBS system is sending DBS guide data in real time and Gemstar is sending OTA channel guide data by pre-load, the improved DBS receiver 50 makes use of both sources of data, presenting them to the user in a single user interface. Although the data limitations and definitions of these two methods are different, the data can nonetheless be combined and then used by a common program guide interface.

Turning to the method of using only the OTA pre-load, currently, e.g., as part of the Guide Plus+ system discussed above, only program data for OTA channels and cable channels available within the vicinity of the host OTA channel are included in the pre-load data broadcast on the host OTA channel's VBI. However, as many of the DBS channels are duplicative of cable channels already included in the host OTA channels pre-load data, it is not terribly burdensome to include program data for exclusively DBS channels as part of the pre-load, on a daily basis or some other agreed upon frequency. Because all of the program data, both for OTA and DBS channels are in the same format, the implementation of the user interface should be easier using only the OTA pre-load method than in the hybrid method .

It is apparent from the foregoing that the present invention satisfies an immediate need for a system and method for providing a seamless electronic program guide for both DBS and OTA channels. The features of this channel mapping system may be embodied in other specific forms and used with a wide variety of telecommunication services, without departing from the spirit or essential attributes of the present invention. It is, therefore, desired that the present embodiment be considered in all respects as illustrative and not restrictive, reference being made to the appended claims rather than the foregoing description to indicate the scope of the invention.

What is claimed is:

1. A system for providing an electronic program guide for both over the air channels and direct broadcast satellite channels comprising:

a video cassette recorder (VCR) comprising:
an RF tuner comprising a VCR RF input and a VCR video output, the RF tuner for tuning and demodulating a tuned video signal from a selected RF channel and supplying the tuned video signal on the video output;
a remote control receiver for receiving channel commands indicating the selected RF channel; and
a direct broadcast satellite (DBS) receiver comprising:
a digital signal decoder for receiving a signal from a satellite dish input and outputting a video signal for a desired direct broadcast satellite channel; and
a remote control transmitter;
a DBS video input connected to the VCR video output;
a DBS video output connected to a television;
an electronic program guide controller connected to the digital signal decoder, the DBS video input and the DBS video output, the electronic program guide controller comprising:
means for communicating the identity of a desired direct broadcast satellite channel to the digital signal decoder;
means for transmitting channel select commands by the remote control transmitter to the RF tuner;
means for selecting the signal for a desired television channel from between the signal for at least one over the air television channel and the signal for a desired direct broadcast satellite channel;
means for creating a video signal containing a representation of program guide for both over the air television channels and direct broadcast satellite channels including means for directing a movable selector to different ones of the over the air television n channels and d direct broadcast satellite channels; and
means for displaying at least a portion of the picture from the over the air television channel or direct broadcast satellite channel to which the selector is directed.

2. The system of claim 1 wherein the direct broadcast satellite receiver further comprises:
an RF modulator with a n input connected to the output of the digital signal decoder and having a modulated RF output for modulating the video signal for the desired direct broadcast satellite channel on the frequency of an unused over the air channel
a two-way combiner with a first input connected to the output of the RF modulator, a second input connected to a RF signal comprising the signal for at least one over the air television channel and a combined RF output, the combined RF output being connected to the VCR RF input.

3. The system of claim 1 wherein the signal for at least one over the air television channel comprises a signal from the output of a television antenna.

4. The system of claim 1 wherein the signal for at least one over the air television channel comprises a cable television signal.

5. A system for providing an electronic program guide for both over the air channels and direct broadcast satellite channels comprising:
a video cassette recorder (VCR) comprising:
an RF tuner comprising a VCR RF input and a VCR video output, the RF tuner for tuning and demodulating a tuned video signal from a selected RF channel and supplying the tuned video signal on the video output; and a cable box comprising
  a cable tuner comprising a cable television signal input and a cable RF output, the cable tuner for tuning and demodulating a tuned video signal from a selected cable channel and remodulating the tuned video signal 1 on a preselected channel on the cable RF output; and
  a remote control receiver for receiving channel commands indicating the selected cable channel; and
a direct broadcast satellite (DBS) receiver comprising:
  a digital signal decoder for receiving a signal from a satellite dish input and outputting a video signal for a desired direct broadcast satellite channel; and
  a remote control transmitter;
  a DBS RF input connected to the cable RF output;
  a DBS RF output connected to the DBS RF input and the VCR RF input;
  a DBS video input connected to the VCR video output;
  a DBS video output connected to a television;
  an electronic program guide controller connected to the digital signal decoder, the DBS video input and the DBS video output, the electronic program guide controller comprising:
    means for communicating the identity of a desired direct broadcast satellite channel to the digital signal decoder;
    means for transmitting channel select commands by the remote control transmitter to the RF tuner;
    means for selecting the signal for a desired television channel from between the signal for at least one over the air television channel and the signal for a desired direct broadcast satellite channel;
    means for creating a video signal containing a representation of program guide for both over the air television channels and direct broadcast satellite channels including means for directing a movable selector to different ones of the over the air television channels and direct broadcast satellite channels; and
    means for displaying at least a portion of the picture from the over the air television channel or direct broadcast satellite channel to which the selector is directed.

6. The system of claim 1 wherein the direct broadcast satellite receiver further comprises:
  an RF modulator with an input connected to the output of the digital signal decoder and having modulated RF output; and
  a switch with one input connected to the output of the RF modulator, a second input connected to the DBS RF input and an output connected to the DBS RF output;
  wherein the means for selecting the signal for a desired television channel further comprises means for sending signals to control the switch.

* * * * *